Feb. 21, 1933.    J. M. SODERSTROM    1,898,269
AUTOMATIC FEED HOPPER
Filed Aug. 18, 1930
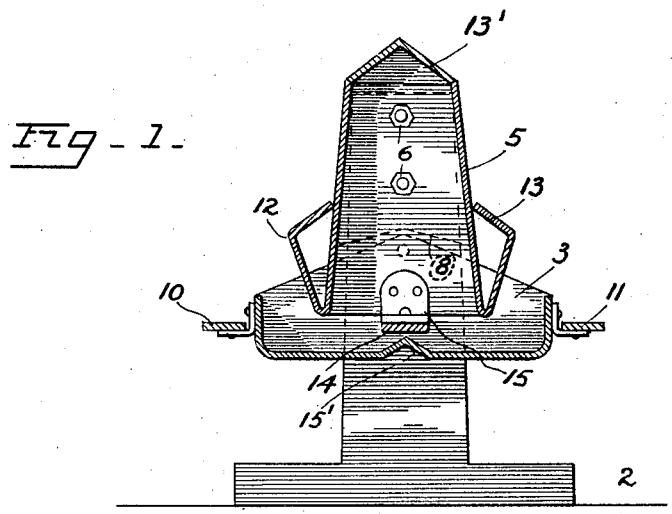
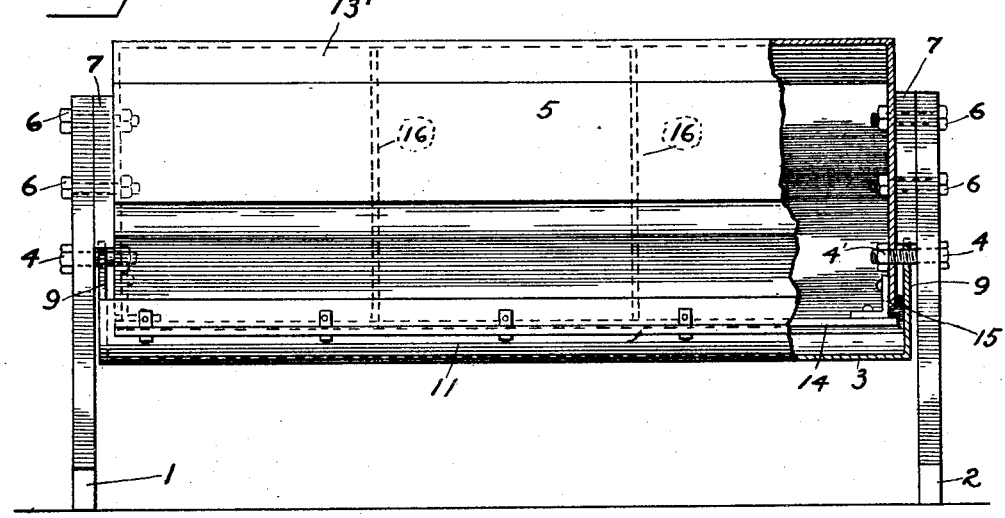
INVENTOR.
JOHN M. SODERSTORM
BY Munn & Co.
ATTORNEYS.

Patented Feb. 21, 1933

1,898,269

UNITED STATES PATENT OFFICE

JOHN M. SODERSTROM, OF TURLOCK, CALIFORNIA

AUTOMATIC FEED HOPPER

Application filed August 18, 1930. Serial No. 476,193.

My invention relates to improvements in automatic feed hoppers, and it consists in the combinations, constructions and arrangements hereinafter described and claimed.

An object of my invention is to provide an automatic feed hopper which is primarily designed to continuously feed mash used for chicken feed, the mash being delivered to the troughs as fast as it is consumed by the chickens. The means for preventing the mash from adhering to the walls of the container consists of a feed trough placed upon a pivotal support, the trough being rocked by the weight of a chicken when the latter steps upon the trough in order to obtain food therefrom. This rocking of the trough causes the mash issuing from the container disposed directly above the trough to be loosened so as to feed by gravity into the trough.

A further object of the invention is to provide, in combination with the rockably mounted trough, a stationary element extending preferably throughout the center of the trough for agitating the contents of the trough each time the latter is rocked and thereby facilitating the feeding of the mash from the container into the trough.

A further object of my invention is to provide a device of the type described which is extremely simple in construction and which is durable and efficient for the purpose intended.

Other objects and advantages will appear as the specification proceeds, and the novel features of the device will be particularly pointed out in the claims hereto annexed.

My invention is illustrated in the accompanying drawing, in which:

Figure 1 is a vertical section through the device, and

Figure 2 is a side elevation, a portion of the device being broken away for clarity.

In carrying out my invention I provide two end uprights 1 and 2 to which a double trough 3 is pivoted by bolts 4 or other suitable fastening means. A container 5 extends between the uprights 1 and 2 and is secured in place by bolts 6. Spacers 7 are disposed between the uprights 1 and 2 and the container so as to permit free rocking movement of the double trough 3. The bolts 4 preferably extend into the end walls of the container so as to take bearing therein and are held in place by nuts 4'.

It will further be noted that the bottoms of the spacers 7 are cut in the manner shown at 8, and that these act as stops for limiting the rocking movement of the double trough 3. The ends 9 of the trough abut the underside 8 of the spacers 7 when the trough has been swung a predetermined distance in one direction or the other. The trough is moved by the weight of a chicken perched upon a platform 10 or a second platform 11. The platforms are disposed a sufficient distance above the ground to cause the chicken to jump upon the platform, and this increased force will cause the trough to rock. The platforms 10 and 11 are carried by the double trough 3 and extend the entire length of the device.

In order to brace the bottom edges of the container and to prevent the chickens from climbing on the edges of the trough, I provide projections 12 and 13 which extend laterally from the container 5 and reduce the space between the edges of the container and the trough.

A cover 13' is removed from the container 5 in order to permit mash or other feed to be placed within the container. The feed drops to the double trough 3 by gravity. A chicken jumping upon the platform 10 will cause the trough 3 to rock in a counter-clockwise direction about the bolts 4. A longitudinally-extending bar or agitator 14 is carried by the container and remains fixed while the trough is rocked so as to agitate the feed within the container 5 and loosen it sufficiently for causing it to drop into the trough. The agitator 14 is carried by brackets 15 secured to the inside of the end walls of the container 5. The constant rocking of the trough caused by the weight of the chickens will feed all of the mash and will prevent it from becoming packed in the container. If desired, the trough 3 can have a reinforcing rib 15' fashioned in the bottom thereof for cooperation with the fixed bar 14 in agitating the feed while the trough is rocked. Partitions 16 separate the feed into compartments and reinforce the container.

Although I have shown and described one embodiment of my invention, it is to be understood that the same is susceptible of various changes, and I reserve the right to employ such changes as may come within the scope of the claims hereto annexed.

I claim:

1. An automatic feeder for chickens comprising two standards arranged in spaced relation and having spacing bars on their inner faces, a hopper supported between the spacing bars, and a trough having end walls pivoted to the standards so as to form a swingable bottom for the hopper, the spacing bars forming a stop for the end walls to limit the swinging motion of the trough.

2. An automatic feeder for chickens comprising a feed hopper tapered to widen toward the bottom, a bar extending centrally across the bottom of the hopper, and a trough swingably mounted below the hopper and having a tapered rib adjacent the bar for cooperation with the latter in stirring material when the trough is moved.

JOHN M. SODERSTROM.